(12) United States Patent  
Holder et al.

(10) Patent No.: US 7,942,560 B2  
(45) Date of Patent: May 17, 2011

(54) APPARATUS AND METHOD OF USING AN LED LIGHT SOURCE TO GENERATE AN EFFICIENT, NARROW, HIGH-ASPECT RATIO LIGHT PATTERN

(75) Inventors: Ronald G. Holder, Laguna Niguel, CA (US); Greg Rhoads, Irvine, CA (US)

(73) Assignee: Cooper Technologies Company, Houston, TX (US)

( * ) Notice: Subject to any disclaimer, the term of this patent is extended or adjusted under 35 U.S.C. 154(b) by 199 days.

(21) Appl. No.: 11/912,498

(22) PCT Filed: Apr. 25, 2006

(86) PCT No.: PCT/US2006/015842  
§ 371 (c)(1),  
(2), (4) Date: Oct. 24, 2007

(87) PCT Pub. No.: WO2006/116518  
PCT Pub. Date: Nov. 2, 2006

(65) Prior Publication Data  
US 2008/0205061 A1   Aug. 28, 2008

Related U.S. Application Data

(60) Provisional application No. 60/676,590, filed on Apr. 28, 2005.

(51) Int. Cl.  
*F21S 8/10* (2006.01)

(52) U.S. Cl. ........ 362/545; 362/544; 362/297; 362/511; 362/330

(58) Field of Classification Search .................. 362/545, 362/542, 543, 544, 612, 623, 312, 29, 302, 362/311, 297, 330  
See application file for complete search history.

(56) References Cited

U.S. PATENT DOCUMENTS

| | | | | |
|---|---|---|---|---|
| 3,958,113 A * | 5/1976 | Termohlen | .................... | 362/231 |
| 4,729,185 A * | 3/1988 | Baba | .............................. | 40/546 |
| 5,128,781 A * | 7/1992 | Ohno et al. | ..................... | 349/65 |
| 5,590,945 A * | 1/1997 | Simms | ........................ | 362/623 |
| 6,174,075 B1 * | 1/2001 | Fuwausa | ........................ | 362/310 |
| 6,305,813 B1 * | 10/2001 | Lekson et al. | ................ | 362/625 |
| 6,476,726 B1 | 11/2002 | Pederson | | |
| 6,811,277 B2 * | 11/2004 | Amano | ........................ | 362/602 |
| 6,948,840 B2 * | 9/2005 | Grenda et al. | ................ | 362/555 |

(Continued)

OTHER PUBLICATIONS

International Searching Authority (ISA/US), International Search Report dated Oct. 17, 2006, 1 page.

*Primary Examiner* — Evan Dzierzynski  
(74) *Attorney, Agent, or Firm* — King & Spalding LLP

(57) ABSTRACT

An LED light source produces a narrow beam of light having a linear field of illumination, which is substantially uniform across the linear field. The light source comprises at least one light emitting diode (LED) and preferably a plurality of LEDs, an optical element for the efficient collection of energy radiating from the LED or LEDs, and an optical element for distributing the collected energy into the linear field of illumination. The apparatus also includes a device or heat sink for thermal management. One or more electronic control circuits are coupled to the LED or LEDs to variably and selectively control them. When a plurality of LEDs are used, the colors produced by the LEDs may different so that the light source is collectively controllable to provide a range of optically mixed colors.

11 Claims, 4 Drawing Sheets

U.S. PATENT DOCUMENTS

| | | | |
|---|---|---|---|
| 7,021,805 B2 * | 4/2006 | Amano et al. | 362/518 |
| 7,111,955 B2 * | 9/2006 | Tsai et al. | 362/103 |
| 7,111,964 B2 * | 9/2006 | Suehiro et al. | 362/328 |
| 7,387,399 B2 * | 6/2008 | Noh et al. | 362/97.1 |
| 7,467,879 B2 * | 12/2008 | Herloski et al. | 362/310 |
| 2002/0141174 A1 * | 10/2002 | Parker et al. | 362/31 |
| 2003/0235050 A1 * | 12/2003 | West et al. | 362/327 |
| 2005/0237766 A1 * | 10/2005 | Klettke | 362/612 |
| 2006/0109675 A1 * | 5/2006 | Herloski et al. | 362/555 |
| 2006/0227393 A1 * | 10/2006 | Herloski | 358/509 |
| 2007/0247857 A1 * | 10/2007 | Herloski et al. | 362/346 |

* cited by examiner

APPARATUS AND METHOD OF USING AN LED LIGHT SOURCE TO GENERATE AN EFFICIENT, NARROW, HIGH-ASPECT RATIO LIGHT PATTERN

RELATED APPLICATIONS

The present application is related to U.S. Provisional Patent Application Ser. No. 60/676,590, filed on Apr. 28, 2005, which is incorporated herein by reference and to which priority is claimed pursuant to 35 USC 119.

BACKGROUND OF THE INVENTION

1. Field of the Invention

The invention relates to the field of apparatus and method for using light emitting diodes (LED) or other light sources to generate an efficient, narrow, high-aspect ratio beam.

2. Description of the Prior Art

The initial investment cost of LED illumination is very expensive when compared with traditional lighting means using the cost/lumen as the metric. While this may change over time, this high investment cost places a premium on collection and distribution efficiency of the LED optical system. The more efficient the system, the better the cost/benefit comparison with traditional illumination means, such as incandescent, fluorescent and neon.

A useful illumination device is the CCFL (cold cathode fluorescent lamp). This lamp is used in scanners, copiers, LCD computer monitors and fax machines as well as many other applications. Newly emerging in these devices is the use of multiple LEDs along a bar to simulate the CCFL.

However, the CCFL can require nearly 30 seconds of warm-up before it is stable enough to calibrate for operation. If LED could be used the devices would need no warm-up.

Utilizing a strip of closely spaced traditional LEDs, however, presents its own problem of thermal heat load due to the close proximity required to get a smooth light output. As the thermal load increases, LEDs will vary in their individual optical output response. This will cause the LED based system's calibration to change over time. This is a marked disadvantage for image quality in these devices.

The prior art in automotive CHMSL's is to use a strip of several LED's to generate a long, narrow output beam. The multiple LEDs may change in intensity as they age, resulting in a non-uniform device.

If a single LED could replace multiple LEDs in a device, cost could be reduced.

What is needed is an optical means to generate a narrow line of light which is not subject to the inherent disadvantages of such prior art.

BRIEF SUMMARY OF THE INVENTION

The illustrated embodiment of the invention pertains to the use of light emitting diode(s) (LED) in a device that optically creates a narrow beam which is highly efficient and substantially uniform in output across its entire length. The illustrated embodiment of the invention provides for the efficient collection of energy radiating from one, two or more LEDs, and then distributes this energy into a long, narrow beam. The illustrated embodiment of the invention further includes thermal management of the device and contemplates electronic control of the individual LED(s).

The disclosed embodiments of the invention are generally utilized as light sources for devices requiring thin illumination, such as those currently using either a small diameter fluorescent tube (CCFL) or a continuous row of small LED's. The apparatus could be used for scanners, copiers, fax machines, backlighting of various displays, automotive center high mounted stop lights (CHMSL), decorative lighting, 7-segment letter formations, emergency light bars for rescue vehicles and many other applications to numerous to list here.

By choosing individually controllable LEDs have a different color, an embodiment of the invention may be generally used in a wide variety of applications as a generic source of selectively controllable color-mixed light. An example is red and blue LEDs combined into an emergency light bar for emergency vehicles that varies from one color to the next. Another embodiment is a traffic speed indicator where a 7-segment device uses a red and a green LED to generate green, amber and red to indicate the speed of an automobile.

The preferred embodiment of the invention is a highly-efficient LED based device with an energy source, at least one LED, an optical cavity comprised of many mirrored surfaces (defined in this specification as a "birdwing"), at least one transparent exit surface and a thermally conductive means for mounting the LED in place within the birdwing. Wherever an LED is described here, it is understood that a plurality of LEDs could be equally substituted for a single LED, whether they be the same or different wavelength. Wherever the birdwing is described here, it is understood that it could be either a hollow mirrored cavity with at least one window as its output surface or a solid, transparent optic with some or all surfaces provided with a reflective coating except the output surface(s). The LED is mounted on a heat conductive material that provides thermal management for the LED. In a preferred embodiment of the invention the Lumileds Side Emitter® LED is used as manufactured by Lumileds Lighting, LLC of San Jose, Calif. There are other conventional substitutes, however, of providing a radial distribution pattern similar to the Lumileds Side Emitter® LED and they are expressly contemplated, as included within the disclosure although they are too numerous to exhaustively list.

The birdwing is optimized for collection of the radial light energy radiation pattern of the LED or the nearly radial light radiation pattern or its functional equivalent pattern. It is designed in such a way as to provide a beam that is approximately uniform across it length and nearly or approximately perpendicular to its output surface, if desired. Again uniformity and perpendicularity need not be exact, but only within the range of functional equivalence in the disclosed context. The birdwing utilizes a combination of required and optional optical features to generate the beam. The illustrated embodiment of the invention describes the radial beam pattern as broken into several theoretical nearly two dimensional angular distributions of the LED radiation pattern and redistributes these according to their respective contribution of the whole and then combines several optical techniques including, but not limited to, reflection, refraction and TIR (total internal reflection) to recombine the angular distributions of light into a desired beam. One method of analyzing the requirement to "steer" light from the LED in this manner is accomplished with a variably controlled, parametric computer model. The device may incorporate as many as 50 or more surfaces, some or all of which may be reflecting or refracting light from multiple virtual sources within the computer model. For example, a "winglet" or "feather" of the birdwing may receive the direct energy of the LED, a TIR reflection from the underside of the output surface, and/or a rebound reflection from another surface in the device.

The preferred embodiment of the invention can create a line of light that is very nearly or approximately perpendicular to its output surface at least within the range of functional equivalence to perpendicularity in the context of this disclosure. This is very beneficial to use this light in a system as additional lenses, diffusers and other optical elements can further enhance the beam for a particular application without losses associated with non-collimated illumination devices.

A plurality of light sources in a device according the illustrated embodiments of the invention allows color combining and other effects when the apparatus further comprises means for individually controlling the intensity of light from each of the light sources, such as conventional drive circuits coupled to the light sources.

Each unit can be comprised of multiple light sources of the same color spectrum, for higher intensity.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The components shown in the diagrams are only the basic optical and elemental components to understand the invention. Omitted from the diagrams are electrical wires, housings, circuit boards, fasteners, attachment means and other components that may be required, but are not essential to the understanding of the device.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
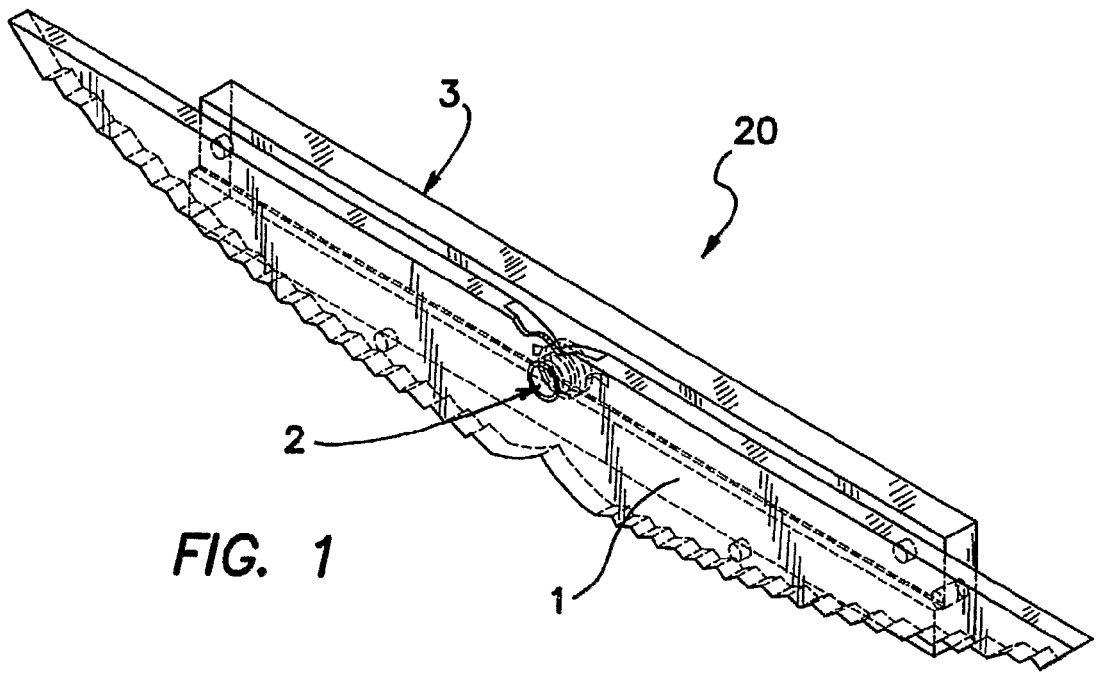
FIG. 1 is a perspective view of one embodiment of the invention in which the LED is shown in phantom outline as attached to a thermally conductive heat sink.

Turn to FIGS. 1-5 wherein the illustrated embodiment of the optical portion of the invention is depicted. FIG. 1 is three quarter perspective view of the device, generally denoted by reference numeral 20, which is comprised of an assembly of various optical and mechanical elements described below. One of the optical elements is a reflective cavity 1, referred to in the descriptions as the birdwing in which the side emitter LED 2 is depicted as being inserted into a nearly cylindrical aperture 12 while being attached to heat sink 3. By LED it is understood to include a solid state light emitting diode package, which includes a semiconductor substrate in which the light emitting junction is defined, electrical leads, passivation layers and a lens or lens assembly mounted on or forming part of the passivating package around the junction and substrate. The illustrated embodiment employs an LED 2, but it is to be understood that any light source may be employed which is now known or later devised, such as incandescent, fluorescent, arc, or gas plasma sources as a few examples. Thus, wherever LED is referred, it is to be understood according to the context that any light source could be equivalently substituted.

Figure 2:
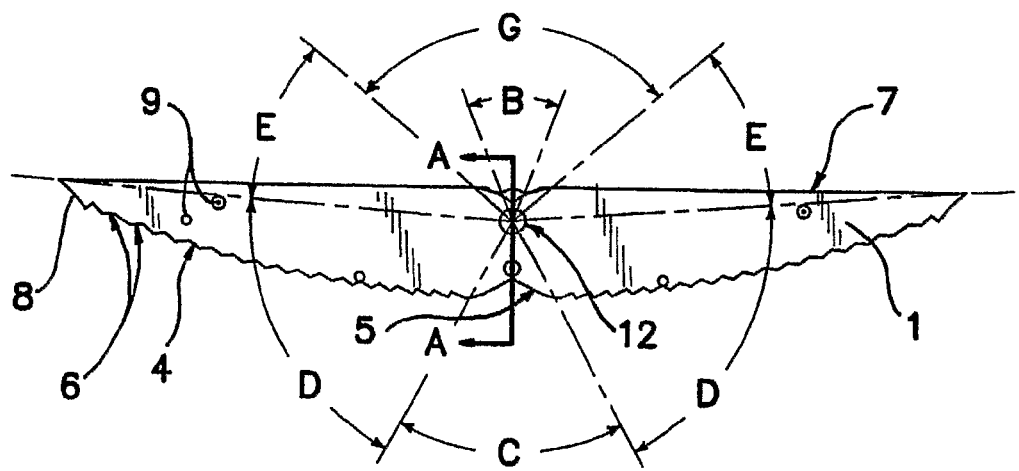
FIG. 2 is a front plan view of the birdwing component of the embodiment of FIG. 1 showing the elements of the birdwing and the radiation angles of a side emitter LED as described.
Figure 3:
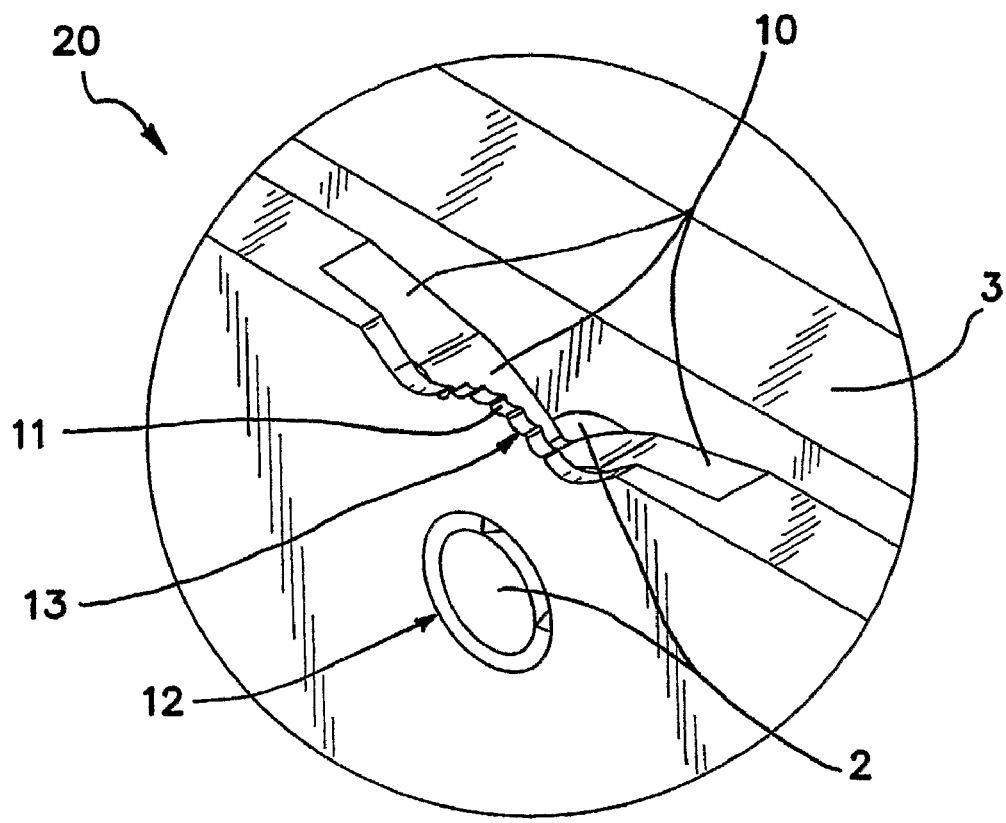
FIG. 3 is a perspective, partial, enlarged view of the embodiment of FIG. 1 with the hidden lines removed.

The light emitted from the LED 2 passes through the cylindrical aperture 12 of reflector cavity 1 and follows one of several paths to output surface 7. The LED 2 radiation pattern is in fact three-dimensional, but can be considered to be two-dimensional as being emitted from a point and radiating outwardly in all directions equally for the purposes of ease of description of the illustrated embodiment of the invention. In FIG. 2 the solid angle of radiation depicted by planar angle D represents rays that directly strike the mirrored winglet surfaces 4 and are mostly reflected toward exit surface 7. The solid angle of radiation depicted by planar angle E in FIG. 2 represents rays that internally reflect off of the underside of exit surface 7, reflect back to the mirrored winglet surfaces 4, 6 and 8, then are reflected back at a nearly perpendicular angle to the exit surface and then transmitted out the exit surface, The solid angle of radiation depicted by planar angle C in FIG. 2 represents rays that are emitted from the LED, reflect off the mirrored surfaces 5, internally reflect off of the underside of exit surface 7, reflect off of the mirrored winglet surfaces 4, 6 and 8, then are reflected back at a nearly perpendicular angle to the exit surface 7 the exit surface 7 and are transmitted out of the exit surface 7. The solid angle of radiation depicted by planar angle G in FIG. 2 represents rays that are emitted from the LED, reflect off of the mirrored and/or TIR surfaces 10, reflect off of the mirrored winglet surfaces 4, 6 and 8, then reflect back at a nearly perpendicular angle to the exit surface 7 the exit surface 7 and are transmitted out of the exit surface 7. The solid angle of radiation depicted by planar angle B in FIG. 2 represents rays that are emitted from the LED, and are refracted from the surfaces 11 which are subset surfaces of profile 13. Planar angles B and G in FIG. 2 overlap in the Z axis. The overlap can best be understood by viewing FIGS. 3 and 4. The ratio of overlap is a determinate variable of the design requirement.

The alignment features 9 shown in FIG. 2 are depicted as examples. However, it is understood that they could be of any configuration commonly known in the art of optical alignment.

Figure 6:
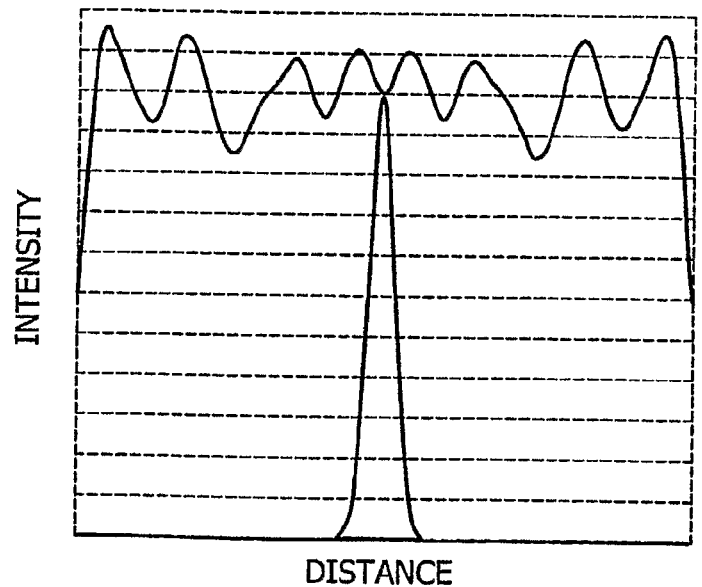
FIG. 6 is a graph of the output of the beam profile as function of vertical and horizontal distance as determined from a ray-tracing computer program showing the theoretical relative intensity of the beam along the length of one embodiment of the invention.

The graph of FIG. 6 shows a typical intensity distribution of an apparatus of the preferred embodiment of the invention. This graph is generated from a computer ray tracing program and is provided to illustrate the potential uniformity of an apparatus of the invention. The curve represents a sampling of data points and is not meant to be an exact depiction of the output of the device.

Figure 7:
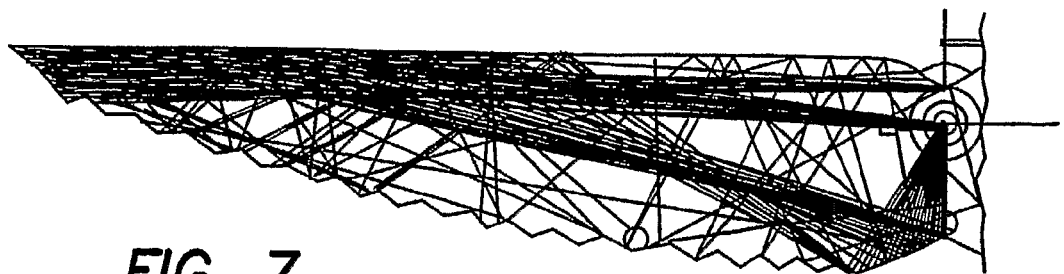
FIG. 7 is a partial, side cross-sectional view of the graphic output of a computer ray-tracing program showing the many paths of light fostered by the invention from the LED to the outermost "winglet" of the birdwing.

The pictorial diagram of FIG. 7 is a computer generated ray trace of a sampling of rays that are emitted from the LED and are reflected by the outermost winglet 8 of the birdwing 1 of FIG. 2. This clearly describes the multiple paths the energy from the LED takes to achieve enough light energy in the extreme end of the system. Considering that light energy is reduced the farther it is displaced from the source, this is the most difficult task successfully realized in the preferred embodiment of the invention in successfully competing with the prior art. The diagram of FIG. 7 shows the direct energy from LED 2 alone would not be able to provide sufficient energy without augmentation of the reflected energy from surfaces 5, 7 and 10.

Figure 8:
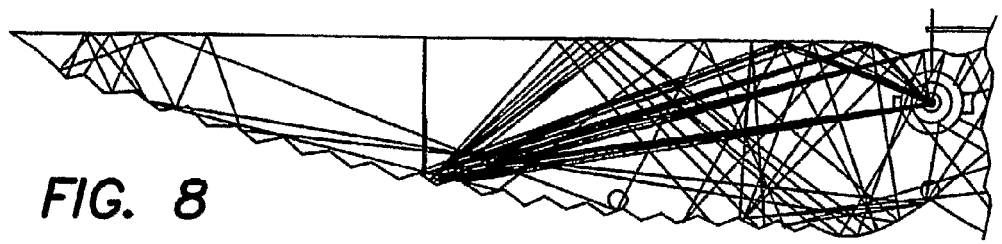
FIG. 8 is a partial, side cross-sectional view of the graphic output of a computer ray-tracing program showing the same cross-sectional view as in FIG. 7, in which many paths of light from the LED to a "winglet" of the birdwing placed near the midpoint between the middle and the end of the device are highlighted.

The diagram of FIG. 8 is a computer generated ray trace of a sampling of rays that are emitted from the LED and are reflected by the middle of winglet surfaces 4 of birdwing 1 of FIG. 2. This describes the multiple paths of the energy from the LED 2 that are required to uniformly distribute energy along the length of the birdwing 1.

Figure 9:
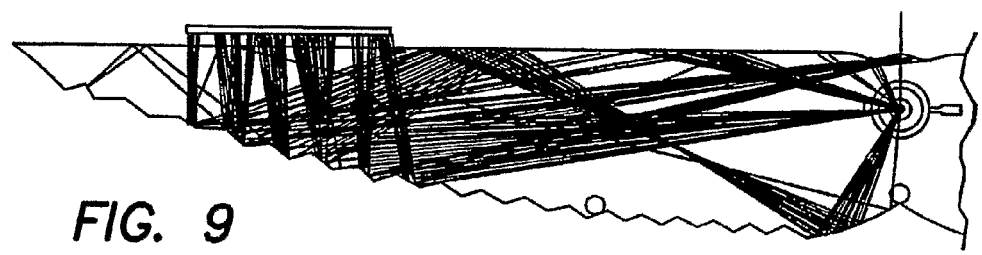
FIG. 9 is a partial, side cross-sectional view of the graphic output of a computer ray-tracing program showing the same cross-sectional view as in FIG. 7, in which many paths of light from the LED to a pseudo surface disposed in front of the birdwing to highlight at least five paths of light from the LED to the surface in question are highlighted.

The pictorial diagram of FIG. 9 is a computer generated backward ray trace of a sampling of rays that are emitted from the LED and are absorbed by an arbitrary short surface placed in front of surface 7 of birdwing 1 of FIG. 2. This again describes the multiple paths of the energy from the LED 2 that are required to uniformly distribute energy along the length of the birdwing 1. The manipulation of surfaces 4, 5, 6 and 10 to provide this uniformity is one object of the invention.

Figure 10:
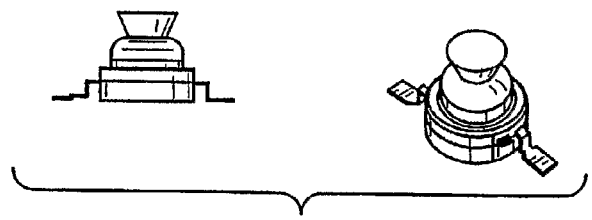
FIG. 10 is a side plan view and a perspective view of the Lumileds Side Emitter® LED package.
Figure 11:
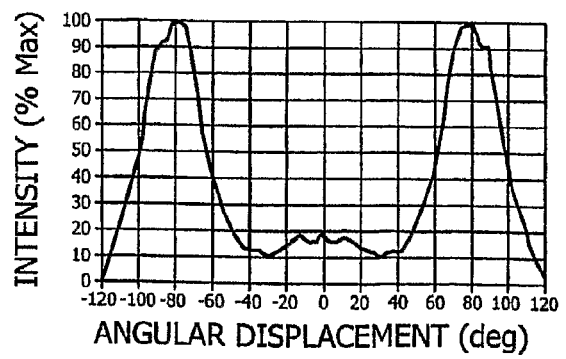
FIG. 11 is a chart of the radiation pattern of the LED of FIG. 10. The chart graphs the luminous intensity as a function of the angular displacement of the light emission of the LED.

The diagram of FIG. 10 and the graph of FIG. 11 describe a commercially available side emitting LED package from Lumileds. While this is utilized in the description of the invention, it is understood that many means of creating an output distribution curve such as the one in FIG. 11 can be substituted without modifying the intent of the invention. It is also understood that one embodiment of the invention may be to incorporate some or all of the side emitting effect of LED 2 by the use of optical surfaces within the invention itself. It is also understood that the aperture cylinder 12 of FIG. 2 could be shaped to provide an additional optical effect and/or provide an improved set of rays in one or all of the planar angles of distribution B, C, D, E and G of FIG. 2. The surface or surfaces of aperture cylinder 12 of FIG. 2 could also be utilized to alter the three-dimensionality of the LED energy emitted from LED 2.

It must be understood that integration of the energy within the birdwing 1 radiated from LED 2 and modified by surfaces 4, 5, 6, 7, 8, 10, 11 and 12 of a device of the invention is a very complex problem with many associated variables. The surfaces depicted in FIGS. 1, 2, 3, 4, 5, 7, 8 and 9 are meant to represent the type of surfaces required of the invention, but more or fewer surfaces may be utilized to achieve the intent of the invention. It is also within the scope of the invention to achieve a designed non-uniformity of output, if desired. This non-uniformity is understood to be either in intensity profile and/or angle distribution.

The basic elements of the invention include, but are not limited to: a side-emitting LED source; a non-circular, substantially rectangular, mirrored cavity with at least one substantially transparent exit surface in which the side-emitting LED source is inserted with its centerline substantially perpendicular to the long axis of the mirrored cavity and disposed behind said exit surface of the mirrored cavity by a predetermined distance.

The mirrored cavity may be entirely constructed of a solid transparent material with some or all of its surfaces, except the exit surface, coated, treated or otherwise enhanced to generate a reflective surface. Alternately, a mirrored cavity may be constructed of surfaces which form an internal air gap device with the exit surface being a window placed as the exit aperture of the device. When this construction technique is used, aperture 12 may be just a hole in the side wall within which the LED is inserted. The construction of surfaces of the device could include a myriad of reflective and refractive surfaces independently constructed and assembled. The device may also be constructed of a combination of solid and air gap methods.

The surfaces depicted in FIGS. 1, 2, 3, 4, 5, 7, 8 and 9 are shown to describe a preferred embodiment of the invention. It is clearly understood that these surfaces could be convex, concave, regular optical surfaces, such as conics and/or surfaces of revolution about any predetermined axis or irregular, non-uniform surfaces. They could also be planar surfaces, notched, dimpled, faceted or other means common in the art for integrating, diffusing, baffling, etc.

It must also be understood that more than one LED may be combined in device 20 according to the foregoing teachings. When more than one LED is used, they may share a common axis, disposed opposite each other within aperture 12 of FIG. 2. Multiple emitters may be disposed within the device and they may be of multiple color frequencies.

Heat sink 3 is typically comprised of metal but any thermally conductive material may be employed.

Figure 4:
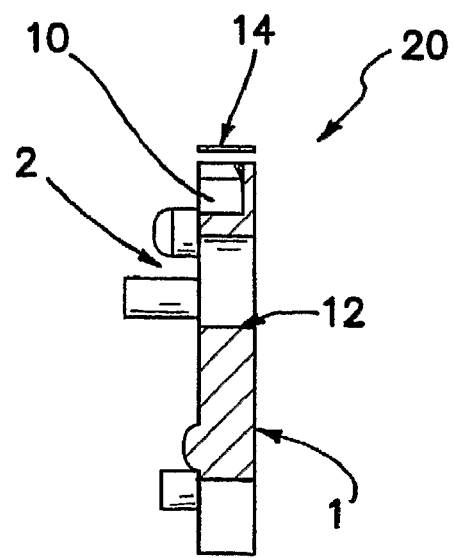
FIG. 4 is a side cross-sectional view of the embodiment of FIG. 2 as seen through section lines A-A of FIG. 2. Additionally shown is an optional lens placeholder of one embodiment of the invention.
Figure 5:
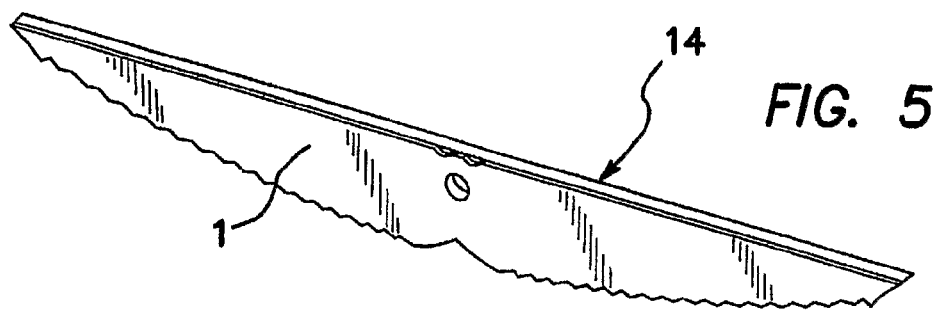
FIG. 5 is a perspective view of the birdwing of FIG. 4 with the optional lens placeholder of one embodiment of the invention in place.

The optional lens 14 shown in FIGS. 4 and 5 is a placeholder for any single lens or combination of surfaces, treatments and/or films that may incorporate a lens or lenses that may be optionally provided to spread or converge the combined light beam, asymmetrically or not, and/or provide diffusion or other optical effects according to preferred design options. Also anticipated by the invention is the modification of the second surface of a device constructed as an air gap design with the same treatments described for optional lens 14 of FIGS. 4 and 5.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

The invention claimed is:

1. An apparatus comprising:
   a single side-emitting light source having an optical axis and radiating light primarily in a nearly two-dimensional light pattern in all azimuthal directions approximately perpendicular to the optical axis; and
   an optic including an optical exit surface having a length and width, the length being substantially greater than the width, the optic being optically coupled to the single side-emitting light source so that substantially all of the light in the nearly two-dimensional light pattern from the light source is transmitted through the exit surface in a direction lying in a plane perpendicular to the optical axis of the light source, the optic being arranged and configured to distribute the light from the light source so that the exit surface provides a substantially uniform intensity, linear field of illumination,
   where the exit surface is a planar strip which is substantially parallel to the optical axis of the light source, except for a predetermined center portion of the exit surface, which center portion is provided with a surface contoured lens to redistribute the light intensity incident upon the center portion more uniformly across the center portion.

2. The apparatus of claim 1 where the optic includes a reflector having a plurality of facets and contours lying in the nearly two-dimensional light pattern, each facet and contour lying in a plan parallel to the optic axis of the light source, the light in the nearly two-dimensional light pattern being comprised of a plurality of separate angular distributions each categorized according to whether the light in the angular distribution is directly incident on the exit surface and exits therethrough, directly incident on the exit surface and is internally reflected toward the reflector, or directly incident on the reflector, and categorized according to the amount of light in each angular distribution as distributed across the exit surface, and where the reflector redistributed the light across the exit surface from the plurality of angular distributions incident on the reflector according to the amount of light in each angular distribution to recombine the plurality of angular distributions of light into the substantially uniform intensity, linear field of illumination on the exit surface taking into account the different amounts of light in the plurality of angular distributions directly incident on the exit surface.

3. The apparatus of claim 2 where the reflector includes a nonfaceted surface and where at least a first facet of the reflector receives direct energy of the side-emitting light source, where at least a second different facet received a TIR reflection from the exit surface, and where at least a third different facet receives a rebound reflection from the nonfaceted surface.

4. An apparatus comprising:
   a single side-emitting light source having an optical axis and radiating light primarily in a nearly two-dimensional light pattern in all azimuthal directions approximately perpendicular to the optical axis; and
   an optic including an optical exit surface having a length and width, the length being substantially greater than the width, the optic being optically coupled to the single side-emitting light source so that substantially all of the light in the nearly two-dimensional light pattern from the light source is transmitted through the exit surface in a direction lying in a plane perpendicular to the optical axis of the light source, the optic being arranged and configured to distribute the light from the light source so that the exit surface provides a substantially uniform intensity, linear field of illumination,
   where the optic included a reflector having a plurality of facets and contours lying in the nearly two-dimensional light pattern, each facet and contour lying in a plan parallel to the optic axis of the light source, the light in the nearly two-dimensional light pattern being comprised of a plurality of separate angular distributions each categorized according to whether the light in the angular distribution is directly incident on the exit surface and exits therethrough, directly incident on the exit surface an is internally reflected toward the reflector, or directly incident on the reflector, and categorized according to the amount of light in each angular distribution as distributed across the exit surface, and where the reflector redistributes the light across the exit surface from the plurality of angular distribution incident on the reflector according to the amount of light in each angular distribution to recombine the plurality of angular distributions of light into the substantially uniform intensity, linear field of illumination on the exit surface taking into account the different amounts of light in the plurality of angular distributions directly incident on the exit surface.

5. An apparatus comprising:
   a single side-emitting light source having an optical axis and radiating light primarily in a nearly two-dimensional light pattern in all azimuthal directions approximately perpendicular to the optical axis; and
   an optic including an optical exit surface having a length and width, the length being substantially greater than the width, where the exit surface is planar strip which is substantially parallel to the optical axis of the light source, except for a predetermined center portion of the exit surface, which center portion is provided with a surface contoured lens to redistribute the light intensity incident upon the center portion more uniformly across the center portion, the optic being optically coupled to the single side-emitting light source so that substantially all of the light in the nearly two-dimensional light pattern from the light source is transmitted through the exit surface in a direction lying in a plane perpendicular to the optical axis of the light source, the optic being arranged and configured to distribute the light from the light source so that the exit surface provides a substantially uniform intensity, linear field of illumination, the optic including a reflector having a plurality of facets and contours lying in the nearly two-dimensional light pattern, each facet and contour lying in a plane parallel to the optic axis of the light source, the light in the nearly two-dimensional light pattern being comprised of a plurality of separate angular distributions each categorized according to whether the light in the angular distribution is directly incident on the exit surface and exits therethrough, directly incident on the exit surface and is internally reflected toward the reflector, or directly incident on the reflector, and categorized according to the amount of light in each angular distribution as distributed across the exit surface, and where the reflector redistributes the light across the exit surface from the plurality of angular distributions incident on the reflector according to the amount of light in each angular distribution to recombine the plurality of distributions of light into the substantially uniform intensity, linear field of illumination on the exit surface taking into account the different amounts of light in the plurality of angular distributions directly incident on the exit surface, where the reflector further includes a nonfaceted surface and where at least a first facet of the reflector receives direct energy of the side-emitting light source, where at least a second different facet of the reflector receives a TIR reflection from the exit surface, and/or where at least a third different facet of the reflector receives a rebound reflection from the nonfaceted surface.

6. The apparatus of claim 5 further comprising means for thermal management.

7. The apparatus of claim 5 further comprising an electronic control circuit coupled to the side-emitting light source.

8. The apparatus of claim 5 further comprising a lens, diffuser or optical element to modify the linear field of illumination for specific application.

9. The apparatus of claim 5 where the light source is combined with a scanner, copier, fax machine, backlight of a display, a vehicular center high mounted stop light (CHMSL), decorative lighting, a 7-segment letter formation, or an emergency illumination source.

10. A method comprising:
radiating light primarily in a nearly two-dimensional light pattern from a single side emitting light source in all azimuthal directions approximately perpendicular to an optical axis;
distributing the light in the nearly two-dimensional light pattern to an optical exit surface to provide a substantially uniform intensity, linear field of illumination, the exit surface having a length and width, the length being substantially greater than the width, substantially all of the light in the nearly two-dimensional light pattern being transmitted through the exit surface in a directions lying in a plane perpendicular to the optical axis; and
redistributing the light incident on a center portions of the exit surface using a surface contoured lens to more uniformly distributed the light across the center portion,
where the light in the nearly two-dimensional light pattern is comprised of a plurality of separate angular distributions, each of which is categorized according to whether the light in the angular distribution is directly incident on the exit surface and exits therethrough, directly incident on the exit surface and is internally reflected toward the reflector, or directly incident on the reflector, and categorized according to the amount of light in each angular distribution as distributed across the exit surface, where distributing the light in the nearly two-dimensional light pattern to an exit surface comprised redistributing the light from the plurality of angular distributions incident on the reflector across the exit surface according to the amount of light in each angular distribution using reflection and/or total internal reflection to recombine the plurality of angular distributions of light into the substantially uniform linear field of illumination on the exit surface taking into account light in the angular distributions directly incident on the exit surface.

11. The method of claim 10 further comprising modifying light transmitted through the exit surface using a lens, diffuser or optical element to modify the linear field of illumination for a specific application.

* * * * *